(12) United States Patent
Goerner (10) Patent No.: US 9,898,548 B1
(45) Date of Patent: Feb. 20, 2018

(54) IMAGE CONVERSION OF TEXT-BASED IMAGES

(71) Applicant: Amazon Technologies, Inc., Reno, NV (US)

(72) Inventor: Martin Goerner, Meudon (FR)

(73) Assignee: Amazon Technologies, Inc., Reno, NV (US)

( * ) Notice: Subject to any disclaimer, the term of this patent is extended or adjusted under 35 U.S.C. 154(b) by 730 days.

(21) Appl. No.: 14/456,867

(22) Filed: Aug. 11, 2014

Related U.S. Application Data

(62) Division of application No. 12/627,695, filed on Nov. 30, 2009, now Pat. No. 8,830,241.

(51) Int. Cl.
  *G06T 3/40* (2006.01)
  *G06T 9/00* (2006.01)
  *G06F 17/30* (2006.01)

(52) U.S. Cl.
  CPC .......... *G06F 17/30905* (2013.01); *G06T 3/40* (2013.01); *G06T 9/008* (2013.01); *G09G 2340/04* (2013.01)

(58) Field of Classification Search
  None
  See application file for complete search history.

(56) References Cited

U.S. PATENT DOCUMENTS

| | | | |
|---|---|---|---|
| 6,563,601 | B1 | 5/2003 | Yamada et al. |
| 2003/0081779 | A1 | 5/2003 | Ogino |
| 2005/0268216 | A1 | 12/2005 | Hayes et al. |
| 2006/0010246 | A1 | 1/2006 | Schulz et al. |
| 2008/0238927 | A1 | 10/2008 | Mansfield |
| 2009/0204888 | A1 | 8/2009 | Miyamoto |
| 2010/0079818 | A1* | 4/2010 | Seo .................. G06K 15/02 358/3.24 |

OTHER PUBLICATIONS

Final Office Action for U.S. Appl. No. 12/627,695, dated Feb. 4, 2014, Martin Goerner, "Image Conversion of Text-Based Images", 29 pages.
Office action for U.S. Appl. No. 12/627,695, dated Feb. 27, 2013, Gorner, "Image Conversion of Text-Based Images", 27 pages.
Non-Final Office Action for U.S. Appl. No. 12/627,695, dated Sep. 27, 2012, Martin Goerner, "Image Conversion of Text-Based Images", 21 pages.
Office action for U.S. Appl. No. 12/627,695, dated Sep. 3, 2013, Gorner, "Image Conversion of Text-Based Images", 27 pages.
Peng et al., "The roles of geography markup language (GML), scalable vector graphics (SVG), and Web feature service (WFS) specifications in the development of Internet geographic information systems (GIS)", Jun. 2004, Journal of Geographical Systems, vol. 6, pp. 95-116.

* cited by examiner

*Primary Examiner* — Matthew Salvucci
(74) *Attorney, Agent, or Firm* — Lee & Hayes, PLLC (57) ABSTRACT

Conversion of text-based images to vector graphics (VG) is disclosed. The text-based images may include images of equations, custom typefaces, or other types of text that may not be included in a font selection of an optical character recognition (OCR) device or an application stored on a viewing device. A textual image may be converted from a raster graphics (RG) image to a VG image, which may enable resizing and alignment of the VG image with body text. In some aspects, the server may determine a body size of a reference character in the VG image. The server may determine a baseline of the VG image that may be used to align the image with the body text.

20 Claims, 8 Drawing Sheets

IMAGE CONVERSION OF TEXT-BASED IMAGES

CROSS REFERENCE TO RELATED APPLICATION

This application is a divisional of co-pending, commonly owned U.S. patent application Ser. No. 12/627,695, filed Nov. 30, 2009, entitled "Image Conversion Of Text-Based Images," the entirety of which is herein incorporated by reference.

BACKGROUND

A large portion of traditional print media (e.g., newspapers, books, research papers, etc.) are viewed on electronic devices. Although much of this media is viewed on personal computers, other types of viewing devices are becoming increasingly popular. For example, mobile smart phones and electronic book readers are convenient devices that enable people to view electronic content having text and images.

Viewing devices come in a variety of sizes. Some viewing devices, such as notebook computers, may include a relatively large screen. Other devices, such as mobile telephones, may include a smaller screen that limits an amount of content that can be displayed on the screen at one time. To accommodate the variance in display sizes of viewing devices, many devices rely on an operating system and/or browser to format text and images to create a functional arrangement of the content. Often, electronic content is formatted using hypertext markup language (HTML) to enable a display of the text in accordance with user- or device-defined preferences. One advantage of HTML is an ability to reflow text from a first line to a subsequent line (or vice versa) when the text would otherwise extend beyond a viewable boundary of a display area. In this way, HTML may avoid the use of horizontal scroll bars when text can be reflowed to subsequent lines.

HTML is often used to present images for display on the electronic devices. A common type of image used in HTML is a raster graphic image (e.g., bitmap, JPEG, etc.), which is a pixel-based format commonly used for photographs. Because raster graphics are resolution dependent, images may appear pixilated when an image is enlarged or may appear distorted when the image is reduced in size. Advantages of raster graphics, meanwhile, include an ability to store any type of image, as well as standardized usage across many applications. In some instances, HTML may add scroll bars to a display to enable viewing an image that extends beyond the viewable boundary of the display area. The scroll bars may break a flow of content and require use of additional navigation commands to view the image via the scroll bars.

One drawback of HTML is a reliance on a host viewing device to include a font designated by HTML code in order for text to appear as an author intends the text to appear. When the font is not loaded in the host viewing device, the device may substitute use of the requested font with a default font or the device may produce an error message. In particular, fonts that include equations and/or custom typefaces may not reproduce properly on a host viewing device when the host does not include a loaded font designated by the HTML code.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and systems to convert text-based images to vector graphics. More specifically, the techniques and systems enable an accurate reproduction of traditional print media in electronic form when the media includes text that has non-standard fonts, such as equations and custom typefaces that cannot be converted to plain text.

As discussed above, some fonts used in traditional print media (or other media) may not be available on a host viewing device. An omission of the font may result in an unanticipated display of the media. For example, when a font is not loaded on a host viewing device, the media may be displayed using a default font or the media may not be displayed at all (e.g., an error message may appear, etc.). One technique to avoid a reliance on loaded fonts is to save the text as an image. However, this technique may be used sparingly, such as when the designated font is an uncommon font (e.g., equations, symbols, custom typeface, etc.). When text is converted to an image, the image may be accurately reproduced on a display alongside text or other images with use of HTML regardless of the content of the image. However, use of images does have some drawbacks in addition to a larger data size of images versus plain text.

When images are used in HTML, the images are commonly stored as raster graphics (e.g., bitmap, JPEG, etc.), which is a widely used image type based on pixel representation that is resolution dependent. Raster graphics are typically used to store photographic images and other pixel based image types. Unfortunately, Raster graphics do have some drawbacks. One drawback is a possible distortion and/or pixilation of an image when the image is resized on a display. Since raster graphics are resolution dependent, they do not accurately scale across different resolutions (various display sizes, etc.).

To avoid problems associated with raster graphics, a raster graphic that includes text may be converted to a vector graphic. Vector graphics represent images using equations that are used to plot points and draw lines, curves and shapes (e.g., polygons, circles, etc.). Vector graphics are typically used to store architectural or engineering drawings (e.g., computer aided drawing, etc.). Examples of vector graphic file types include scalable vector graphics (SVG), mathematical markup language (MathML), and the portable document format (PDF) created by Adobe Systems®. Unlike raster graphics, vector graphics can be resized without a noticeable loss of quality, thus they do not become pixilated or distorted when they are resized.

In some embodiments, the text-based image that is stored as a raster graphics image (RG image) may be tagged for conversion to a vector graphics image (VG image). Before or after the conversion, attributes of the text within the image may be extracted and stored with the image. In various embodiments, breaks in the image may be identified to enable reflow of the VG image. The VG image may be formatted for display, via HTML or similar code, in-line with other text to enable a relatively smooth transition between text and the VG image. More specifically, a smooth transition may include an aligned baseline of the VG image and adjacent text and similar sizes of a reference character in the VG image and the adjacent text. The VG image may also enable reflow. Although HTML is referenced herein as one way to style/format text, other known software may be used to perform a similar function such as LaTeX.

The techniques and systems described herein may be implemented in a number of ways. Example implementations are provided below with reference to the following figures.

Illustrative Environment

Figure 1:
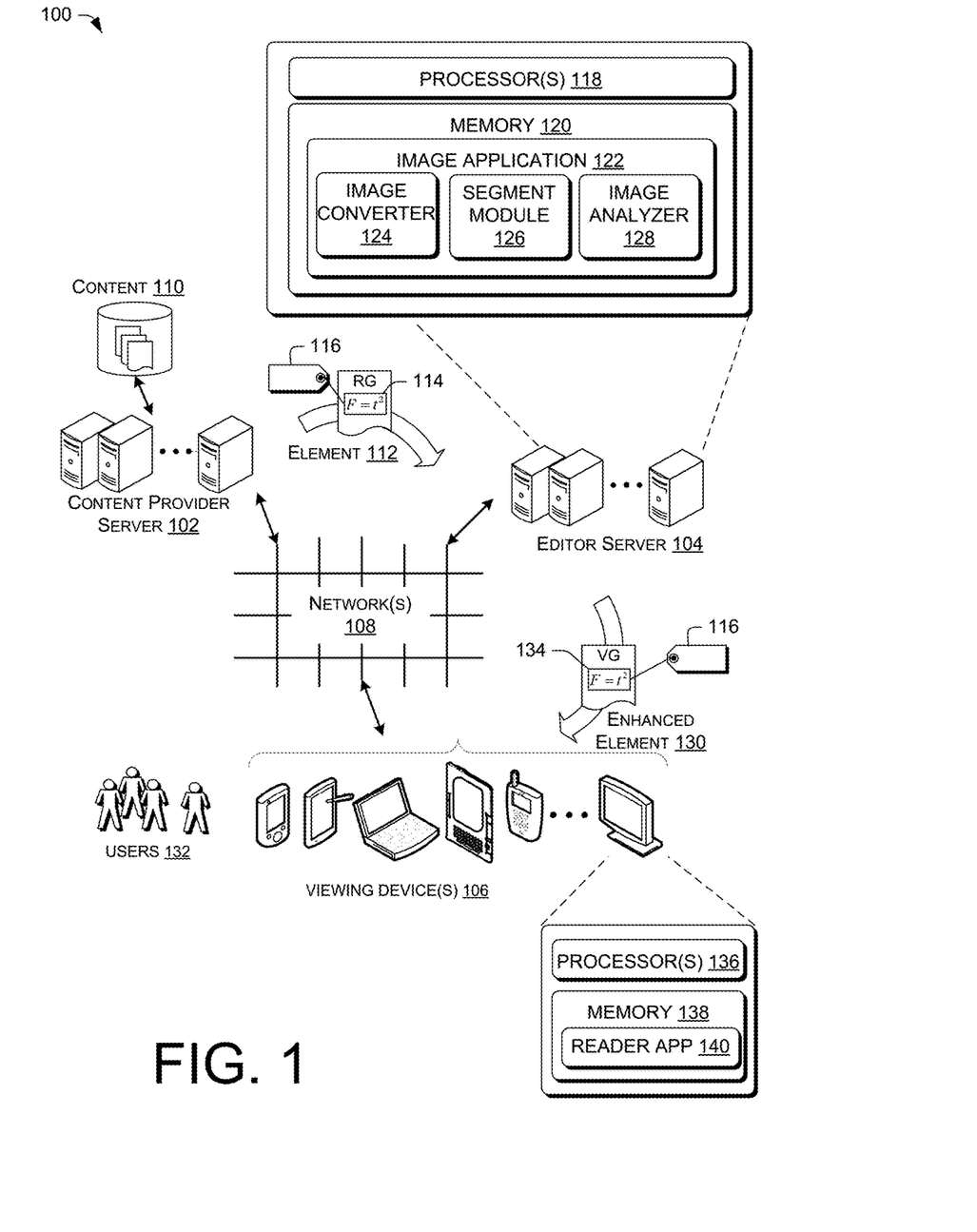
FIG. 1 is a schematic diagram of illustrative subsystems of various computing devices to provide image conversion of text-based images to vector graphics.

FIG. 1 is a schematic diagram of illustrative environment 100 that includes various computing devices that enable image conversion of text-based images to vector graphics. The environment 100 may include a content provider server 102, an editor server 104, and a viewing device 106, each in communication via one or more network(s) 108.

The content provider server 102 may be hosted by any provider of digital text-based content 110 ("content"), such as a publisher, an author, or an intermediary that converts print text to electronic form, among other possible entities. The content 110 may include books, magazines, newspapers, newsletters, manuals, guides, references, articles, reports, documents, or other text-based content. In some embodiments, the content 110 may include images. The images may be photographs, illustrations, tables, charts, or other graphical information that may or may not include text-based (textual) information.

In accordance with embodiments, the content provider server 102 may transmit an element 112 of the content 110 to the editor server 104 via the network 108. The element 112 may be an electronic form of the content 110. For example, the element 112 may be a scanned book that has been converted to text and images. Some of the images may have portions that are converted to text using optical character recognition (OCR). The images may be stored as raster graphics images (RG images) in formats such as bitmap, JPEG, or other raster graphics image formats. Portions of the scanned book that are not recognized by the OCR may be stored as separate images, which may be styled by HTML code for placement with the text as intended by an author, editor, etc. In some embodiments, the element 112 may include text, images, and HTML code that stylizes or formats the text and images for a presentation.

The element 112 may include at least one text-based image that is stored as a RG image 114. Although the subsequent discussion references "RG image 114," the element 112 may include multiple RG images 114 that may ultimately be converted to vector graphics images. The RG image 114 may be, without limitation, an image of a mathematical equation, a scientific equation, a custom typeface or any other text-based representation. As used herein, custom typeface includes non-standard typefaces which may not be recognized by OCR software, a browser, or other software. The custom typeface may include user-invented typeface, fantasy/sci-fi typefaces, or the like.

Although some or all of the text of the element 112 may be converted to plain text via OCR or another technique, the RG image 114 may not be converted to plain text by the OCR for various reasons. One reason may be that the OCR may be unable to identify or recognize the text in the RG image 114 because the text has a non-standard font, type, or other features. Another reason may be that the OCR may only convert text having a font that is widely used across many viewing devices 106 (e.g., Times New Roman, Arial, Courier, etc.), whereas less common fonts are stored for display using the RG image 114. In addition, the element 112 may include a tag 116 that identifies the image as being text-based and may include additional attributes of the image.

The editor server 104 may receive the element 112 from the content provider server 102. The editor server 104 may convert the RG image 114 of the element 112 to a vector graphics image (VG image), among other possible operations that may be performed on the element.

As illustrated, the editor servers 104 are equipped with one or more processors 118 and memory 120. The memory 120 may include applications, modules, and/or data. In some embodiments, the memory 120 may include an image application 122, which may facilitate conversion of text-based images from raster graphics to vector graphics, formatting the vector graphics with other text, and other related operations.

The image application 122 may include a number of modules such as an image converter 124, a segment module 126, and an image analyzer 128. The image converter 124 may be used to convert the RG image 114 to a VG image. The conversion may be performed by algorithms that identify patterns in the pixilated raster graphics, which can then be used to create equations necessary to support vector graphics.

In accordance with one or more embodiments, the segment module 126 may determine breaks along a text-based image that may enable division of the image into segments. The use of segments may enable breaking a relatively long image (e.g., an image of an equation, etc.) into a first segment, a second segment, and so forth. When the converted image is displayed, the first segment may be displayed on a first line while a second (or later segment) may be displayed on a subsequent line to enable a reflow of text and images in a display. The segments may be defined by break lines in common types of text-based images (e.g., mathematical/scientific equations, custom typefaces, etc.). The break lines may be known (predetermined, etc.), identified as vertical white spaces (or gaps) within the text-based images, or determined based on cues (known shapes, etc.) in the text.

The image analyzer 128 may perform various heuristics on the element 112. In some embodiments, the image analyzer 128 may determine which images of a group of images are converted from raster graphics to vector graphics. For example, the image analyzer 128 may identify when an image includes text-based content. The image analyzer 128 may determine attributes of the element 112. The attributes may include a baseline position, which may be a vertical indicator for locating the image in HTML and/or a body size of font used in the image, which may be used to size the image in accordance with a font size designated in the HTML code. The attributes may also include a horizontal spacing indicator to enable consistent spacing between body text that is adjacent an image and text within the image.

In accordance with various embodiments, the editor server 104 may transmit an enhanced element 130 to the viewing device 106 for viewing by users 132. The enhanced element 130 may include a VG image 134 and the tag 116. The tag 116 may identify the VG image 134 as a text-based image and may include other attributes such as the baseline and the body size, which may be determined by the image analyzer 128.

In one or more embodiments, the viewing device 106 may comprise a personal computer, an electronic book reader (e-book reader), a tablet computer, a mobile telephone, a personal digital assistant (PDA), a television, a set top box, a gaming console, or another electronic device. The viewing device 106 may be capable of receiving the enhanced element 130 and causing the display of the enhanced element on a display device. The viewing device 106 may include one or more processor(s) 136 and memory 138. The memory 138 may be used to store a reader application 140.

The reader application 140 may process and display the enhanced element. In some embodiments, the reader application 140 may be a Web browser or other browser that can format text based on HTML code. The reader application 140 may reflow text for display by the viewing device 106 such that the text, VG images 134, and other images (RG images that are not text-based) are presented as intended by a content provider (e.g., the author, editor, publisher, etc.). In some embodiments, the reader application 140 (or sub-operations controlled thereby) may be executed by the editor server 104 or another remote server such as on an online reader application. Thus, the reader application may be stored and executed locally on the viewing device 106 or remotely on another server (e.g., the editing server 104, etc.).

Figure 2:
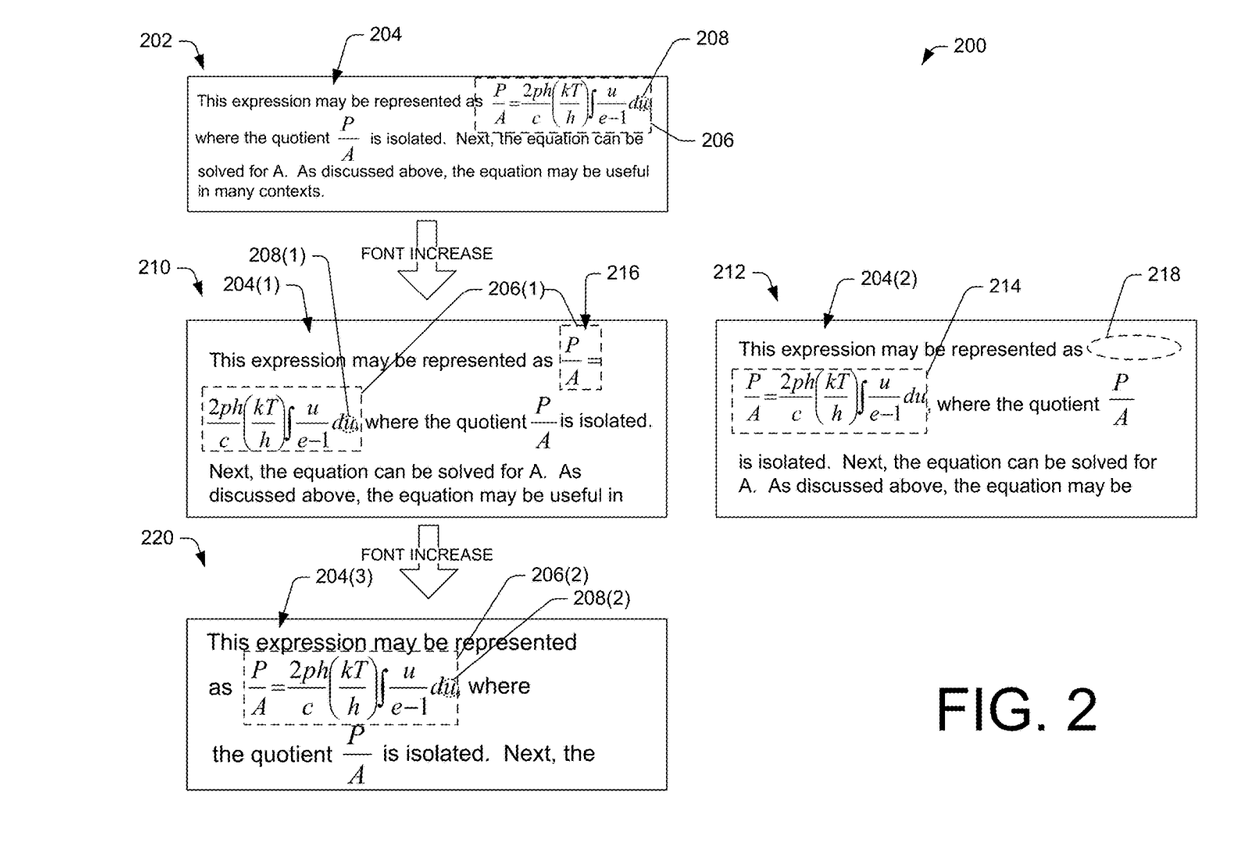
FIG. 2 is a schematic diagram of illustrative text conversion of text-based images that are displayed with text having various font sizes.

FIG. 2 is a schematic diagram of illustrative page 200 having converted text-based images (e.g., the VG image 134) that are displayed with text having various font sizes. A first sample page 202 includes a text portion 204 and a vector graphics text-based image (VG image) 206 that has been converted from raster graphics text-based image (e.g., the RG image 114). The text portion 204 may have an associated font size (e.g., 12 point font). In the first sample, a reference character 208 may be selected and used to establish a size and location of the VG image. For example, the reference character 208 may be the "u" that is the last letter in equation. A body size of the reference character 208 may be determined (via human input, a heuristic, etc.), which may enable an adjustment of a size of the VG image 206 so that the body size of the reference character 208 is substantially the same size (e.g., up to 10% deviation, etc.) as the font size (i.e., text body size) of the text portion 204. In addition, a baseline location of the reference character 208 may be aligned with a baseline of the text portion 204 to create a continuous line of text between the VG image 206 and the text portion 204.

A second sample 210 illustrates an increase in the font of text (e.g., increase from font size 12 to font size 16). For example, a user may adjust a font size by adjusting a user control on the viewing device 106 or the viewing device may configure the font size based on a screen size or default preferences stored by the viewing device, among many possibilities. The font size of the text portion 204(1) is larger than the font size of the text portion 204 in the first sample 202. To create a seamless transition between an enlarged VG image 206(1) and the text portion 204(1), the VG image is enlarged to match the font size of the second portion, based in part on the body size of an enlarged reference character 208(1). In addition, the location of the VG image 206(1) may be adjusted to align the baseline of the enlarged reference character 208(1).

A third sample 212 shows a contrasting illustrative result of the font increase that was applied to the second sample 210 when the text-based image is a raster graphics text-based image ("RG image") 214. To create the third sample 212, the RG image 214 was resized in an attempt to match the font size of the body text 204(2). However, the resizing of the RG image may cause pixilation that is detectable by a human, which is inherent in raster graphics when increasing the size of an image beyond the original size of the image. Second, the baseline of the RG image 214 may not match the baseline of the text portion 204(2), which may create an unnatural flow of the text in the third sample. Thus, the third sample 212 shows an example of a possible display of a text-based image, but does not include aspects of the second sample that create a smooth transition between the text portion 204(1) and the VG image 206(1) for at least three possible reasons: (1) misalignment of text size, (2) misalignment of text baseline, and (3) image distortion and/or pixilation. The smooth transition may include an aligned baseline of the VG image and adjacent text and similar sizes of a reference character in the VG image and the adjacent text.

In some embodiments, the VG image 206(1) may enable reflow by segmentation of the VG image at a break point 216. This may enable reduction of white space 218 that is included in the third sample 212, which may occur when the RG image 214 (or the VG image 206 in some instances) is not configured to enable reflow. Similarly, the VG image 206(1) may not be configured for reflow in some embodiments, which may prevent breaks in the VG image.

A fourth example 220 may illustrate another increase in font size (e.g., font size=20 point font). Again, a text portion 204(3) may include a larger font, which may cause the text to reflow from a first line to a subsequent line. In addition, an enlarged VG image 206(2) may be presented with a substantially similar font size of an enlarged reference character 208(2). Because the VG image 206(2) is located between plain text on either side of a single line of text, the VG image 206(2) may not need to utilize a break point and undergo segmentation for reflow as shown in the second sample 210.

Illustrative Operation

Figure 3:
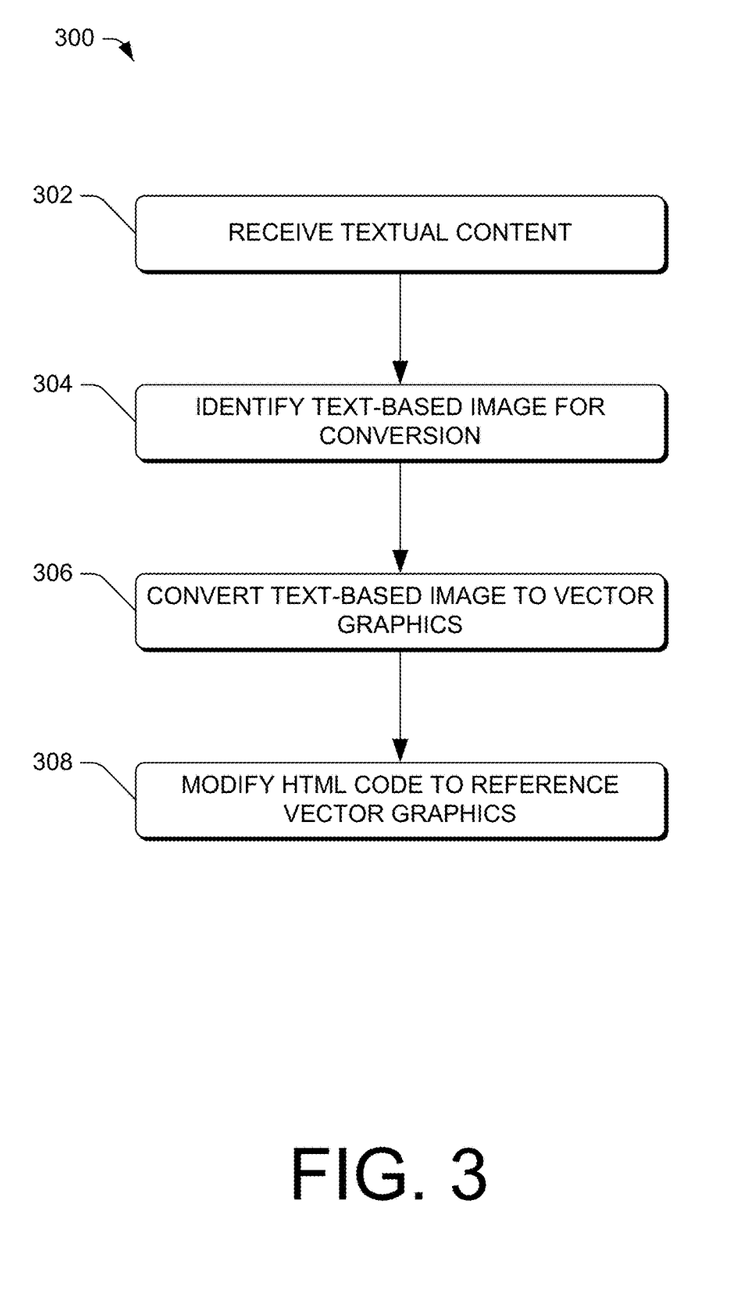
FIG. 3 is a flow diagram of an illustrative process of converting a text-based image to a vector graphic.

FIG. 3 is a flow diagram of an illustrative process 300 of converting a text-based image to a vector graphic. The process 300 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly. The process 300 may be performed by the image application 122 and/or any of the modules of the image application that are stored on the editor servers 104.

At 302, the editor servers 104 may receive textual content (i.e., text-based content) from the content provider servers 102. The textual content may be the element 112 that includes the RG image 114 having text-based content and other images.

At 304, the image converter 124 may identify the RG image 114 for conversion to the VG image 134. The image converter may identify the RG image 114 based on information in the tag 116 (e.g., designator, etc.), by use of heuristics, or by other techniques.

At 306, the image converter 124 may convert the RG image 114 to the VG image 134. For example, the image converter 124 may perform a transformation of the RG image 114 to convert pixilated data into equations of vector graphics to create the VG image 134.

At 308, the image application 122 may modify HTML code by replacing a reference to the RG image 114 with a reference the VG image 134. The user 132 may then view content that includes a smooth transition between adjacent plain text and the VG image 134 when viewed on the viewing device 106. The smooth transition may include an aligned baseline of the VG image 134 and adjacent text and similar sizes of the reference character 208 in the VG image and the adjacent text.

Figure 4:
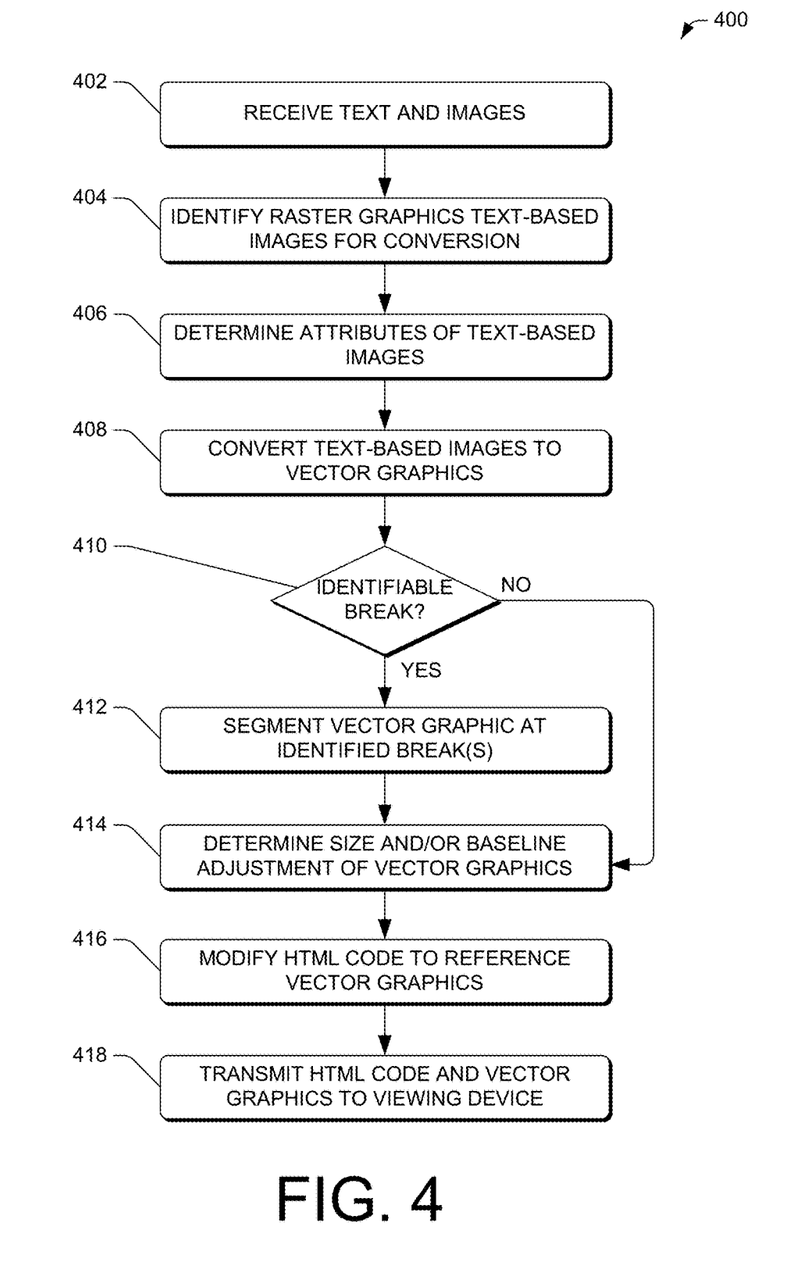
FIG. 4 is flow diagram of another illustrative process of converting a text-based image to a vector graphic that includes size and baseline information.

FIG. 4 is flow diagram of another illustrative process 400 of converting a text-based image to a vector graphic that includes size and baseline information. The process 400 may be performed by the image application 122 and/or any of the modules of the image application that are stored on the editor servers 104.

At 402, the image converter 124 may receive text and the RG image 114 from the content provider server 102. In some embodiments, the content provider server 102 may include the tag 116 to indicate which images are text-based images (i.e., the RG image 114 as compared to non-text-based images) that may undergo a conversion to vector graphics. At 404, the image converter 124 may identify the RG image, such as via the tag, heuristics, or human detection.

At 406, the image converter 124 may determine attributes of the text-based image, such as the baseline of text, the body size, or other attributes. The attributes may be used for positioning, sizing, or otherwise modifying the text-based image when the image is converted to vector graphics and/or when the image is formatted for viewing with plain text on the viewing device 106. At 408, the image converter 124 converts the RG image 114 to the VG image 134.

At 410, the segment module 126 may determine whether the VG image includes an identifiable break which may enable segmentation of the VG image. For example, the VG image may include one or more vertical white spaces where the VG image may be partitioned with the break point 216. The break point 216 may enable reflow of the VG image to avoid the white space 218 shown in the third sample 212 in FIG. 2. The VG image may be segmented at 412 when an identifiable break is located in the VG image. In some embodiments, the VG image may include multiple instances of the break point 216, which may enable multiple reflow break options during a reflow display process (as discussed below). In some embodiments, the segments of the VG image may be stored as separate but related VG images.

After segmentation, or when no break is identified, then the process 400 may continue to an operation 414. At 414, the image application 122 may determine the size and/or baseline adjustment of the VG image. The size and baseline adjustment may be obtained from the attributes that are determined at the operation 406, by heuristics, by human detection, or by other techniques.

At 416, the image application 122 may modify HTML code to reference the VG image. For example, HTML code may be included with the text and images at the operation 402. The HTML code may include an image reference to the RG image 114 that may be changed to reference the VG image 134 after the image conversion to vector graphics. In addition, the HTML code and/or the VG image 134 may include additional attributes such as the baseline, the body size, segmentation breaks, and/or other attributes of the VG image.

At 418, the editor server 104 may transmit the HTML code, text, vector graphics, and any other non-text-based images to the viewing device 106. The viewing device 106 may then enable the users 132 to view the enhanced element 130 having a smooth transition between the text and VG image. Further, the VG image may be free from distortion or pixilation that may occur after resizing raster graphics.

Figure 5:
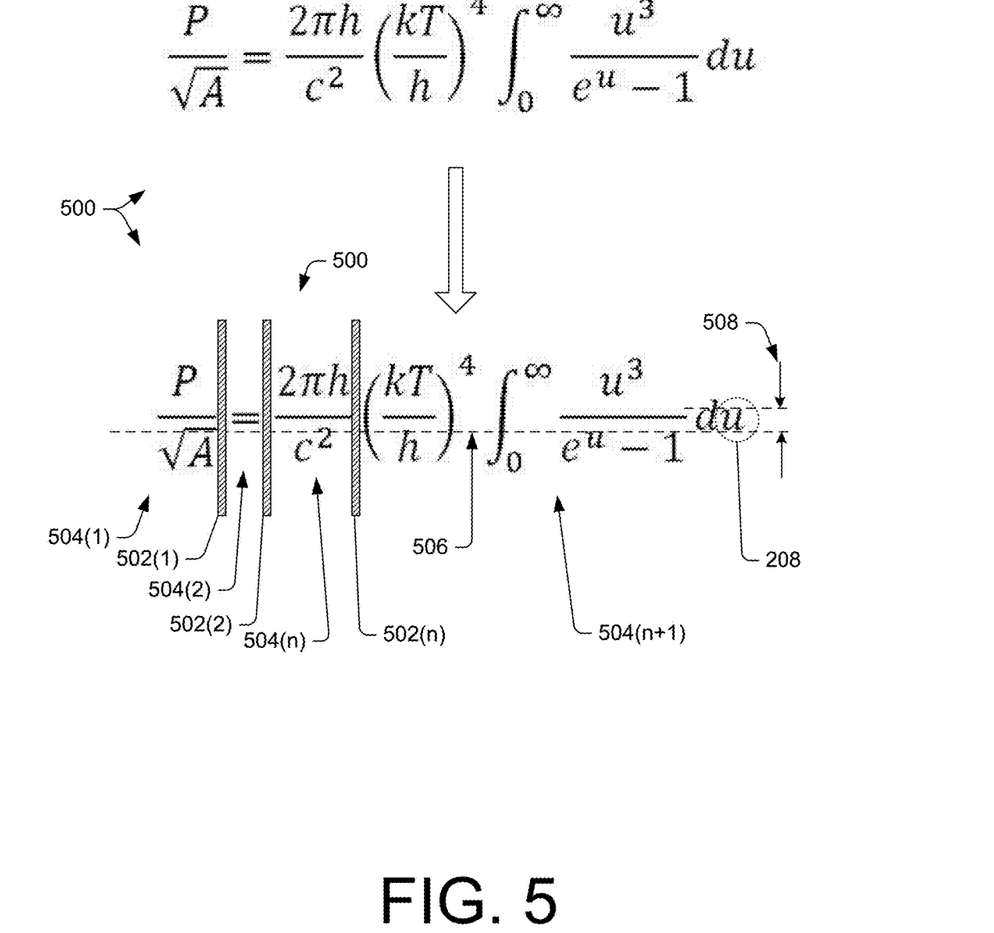
FIG. 5 is a schematic diagram of an illustrative text-based image that includes possible reflow breaks and that may be used to identify attributes of a baseline and a body size of text.

FIG. 5 is a schematic diagram of an illustrative text-based image 500 (e.g., VG image, etc.) that includes possible reflow breaks and that may be used to identify attributes of a baseline and a body size of text. The text-based image 500 may be analyzed by the segment module 126 to determine possible break lines 502, such as a first break line 502(1), a second break line 502(2), . . . , and a last break line 502(n). The break lines may be located in vertical white spaces in the text-based image, such as where white space (i.e., a space without text) creates a vertical gap in the text-based image. The break lines may also be located by human interaction, designation by the editors, authors, etc., and/or placed in a predetermined location (e.g., predetermine distance(s), after operands, etc.). When multiple break lines are identified in the text-based image, the image may be stored as multiple related image portions 504 to enable reflow of the image. In an example reflow of the text-based image 500, a first portion 504(1) and a second portion 504(2) may be displayed on a first line while a third portion 504(n) and a last portion 504(n) may be stored on a subsequent line to enable a reflow of the text-based image as shown the second sample 210 of FIG. 2.

The text-based image 500 may also include an identified baseline 506 and a body size 508. The baseline and body size may be based on the reference character 208 or on different characters. In some instances, the baseline may be selected at a position relative to the reference character (e.g., horizontal line in a fraction, etc.). The baseline may be obtained from the attributes (via the tag 116, by human input, or by heuristics). For example, a low point of the reference character 208 may be detected as the baseline position, which may then be projected as a vertical line across the image. Similarly, the body size may be obtained by first determining a high point of the reference character 208 and then measuring a distance between the high point and the low point to calculate the body size. The body size may be compared to the font size of the text associated with the image to enable resizing of the image to match another font size. In this way the reference character (and other textual content in the image) may be resized with the body text of the enhanced element 130 to maintain a desired proportion of the text-based image.

Figure 6:
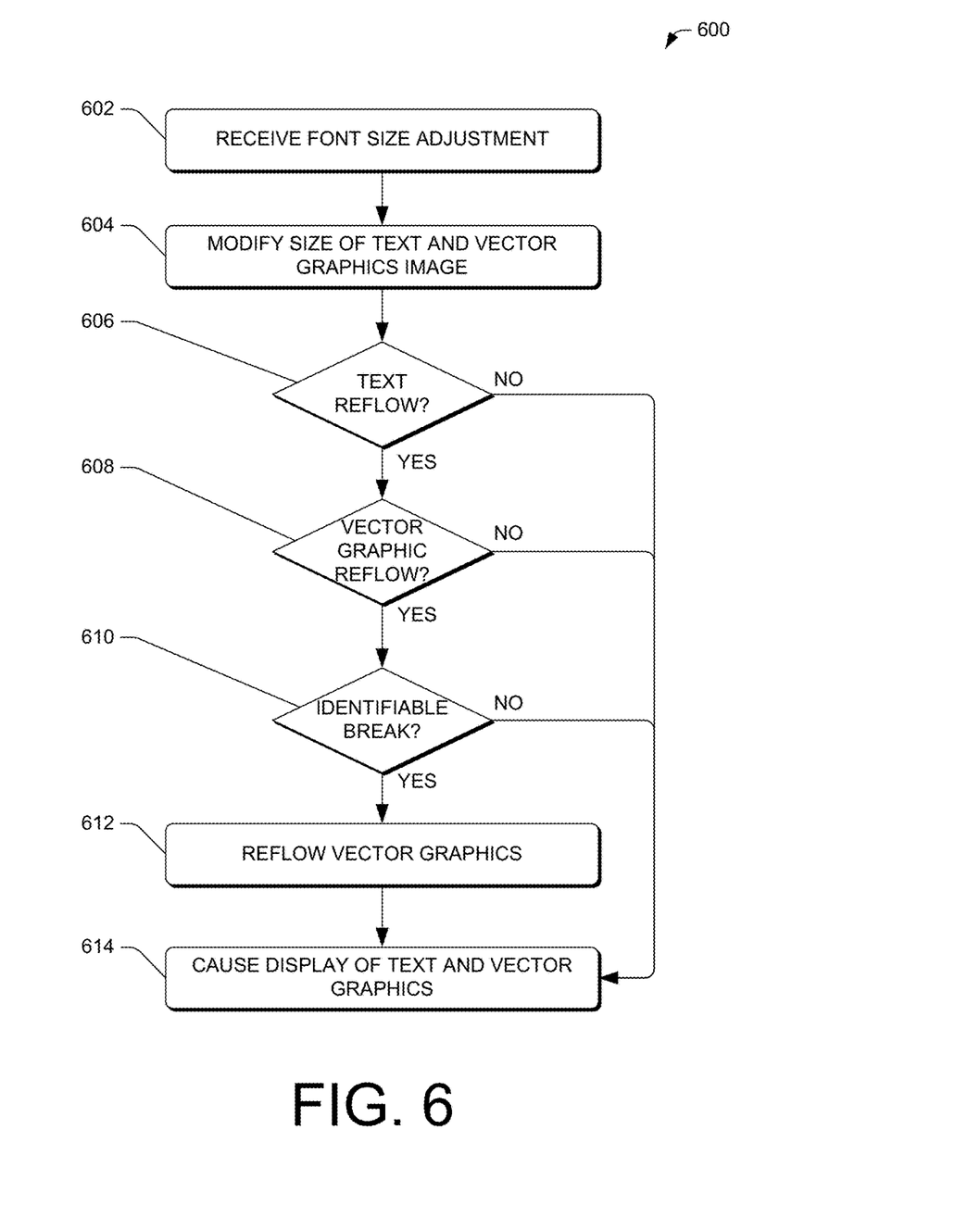
FIG. 6 is a flow diagram of an illustrative process of reflowing vector graphics that include an identifiable break.

FIG. 6 is a flow diagram of an illustrative process 600 of reflowing vector graphics that include an identifiable break. The process 600 may be performed by the reader application 140 that is stored on or remotely from the viewing device 106.

At 602, the reader application 140 may receive a request to adjust a font size of the currently displayed content. For example, the user 132 may adjust the font size of text made viewable on the viewing device 106 by adjusting a user control. In other instances, the viewing device may adjust the font size to a predetermined value such as a default value for the device. The default value for a relatively small device (e.g., mobile telephone, PDA, etc.) may be smaller than a default value for a relatively larger viewing device (e.g., laptop computer, etc.).

At 604, the reader application 140 may modify the size of text and the VG image for display on the viewing device 106 based at least in part on the receiving of the request. The VG image may be resized based on the body size 508. For example, the VG image may not be resized when the body size is the same size as the selected font. However, the VG image may be reduced in size to match the size of the reference character with the size of the selected font when the body size of the VG image is larger than the selected font size.

At 606, the reader application 140 may determine whether to reflow the text and the VG image. At 608, the reader application 140 may determine whether the vector graphics are allowed to reflow. For example, in some instances a reflow feature may be turned off to prohibit reflow of the VG images. At 610, the reader application 140 may determine if the VG image includes identifiable breaks to enable use of the reflow. The VG image may be reflowable when break lines 502 are identified in the VG image and the image is segmented as discussed with reference to the operation 412 of the process 400.

When all of the decision operations 606, 608, and 610 are true (yes), then the reader application 140 may reflow the VG image to minimize occurrences of the white space 218 that may otherwise be present when no text reflow or VG image reflow is enabled by the reader application 140 (i.e., when one or more of the decision operations 606, 608, and 610 are false (no)). At 614, the reader application 140 causes display of the text and the VG image. When any of the decision operations 606, 608, and 610 are false (no), then the process 600 may continue directly to the operation 614 and omit the operation 612.

Figure 7:
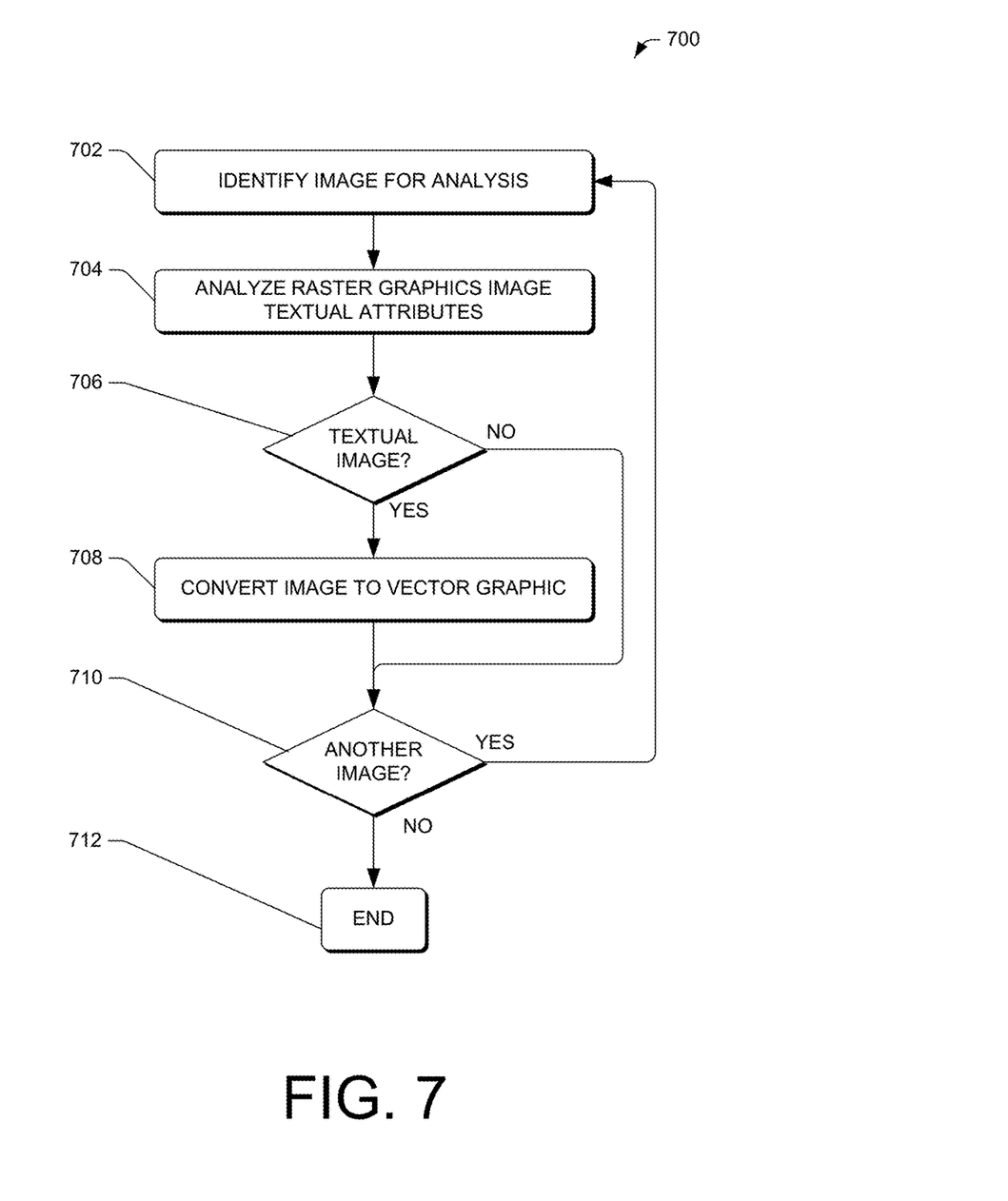
FIG. 7 is a flow diagram of an illustrative process of analyzing a raster graphic image to determine whether the image is a text-based image.

FIG. 7 is a flow diagram of an illustrative process 700 of analyzing an RG image to determine whether the image is a text-based image. The analysis may initiate a conversion of the RG image to a VG image when the RG image is text-based in accordance with the process 700. The process 700 may be performed by the image converter 124 and/or the image analyzer 128 that are stored on the editor servers 104.

At 702, the image analyzer 128 may select an image for analysis to determine whether the image is a candidate for a conversion from raster graphics to vector graphics. In some embodiments, the image analyzer 128 may first scan a document (e.g., a magazine, book, etc.) and then determine whether the image is a candidate for the conversion. Alternatively, the image analyzer 128 may receive a digital image from another source (e.g., an author, publisher, etc.) and then perform the analysis at 702. For example the image may be received from the content provider server 102.

At 704, the image analyzer 128 may analyze the image to determine whether the image is a textual image (e.g., equation, custom typeface, etc.). The analysis at the operation 704 may enable selective conversion of raster graphics to vector graphics. Some graphics, such as photographic images, may not be supported or recreated properly using vector graphics. Thus, the process 700 identifies candidates for the conversion via the operation 704. In some embodiments, the image analyzer 128 may determine that an image is a textual image based on a color analysis of the image (e.g., images that are in grayscale or black and white may indicate textual content). In addition or alternatively, known shapes may be identified in the image to indicate a likelihood of textual content (letters, equation symbols, script shapes (circles, triangles, etc.).

At 706, a decision operation queries whether the image is a textual image (as determined by the analysis at the operation 704). When the image is determined to be a textual image, the process 700 proceeds to an operation 708 where the image is converted to the VG image as discussed with reference to the operation 408 of the process 400. If the image is not a textual image, then the image is preserved as the RG image and the process omits the operation 708. At 710, the process 700 determines whether another image requires analysis and possible conversion to vector graphics. The process 700 ends at 712 when no further images are available for analysis via the decision operation at 710.

Figure 8:
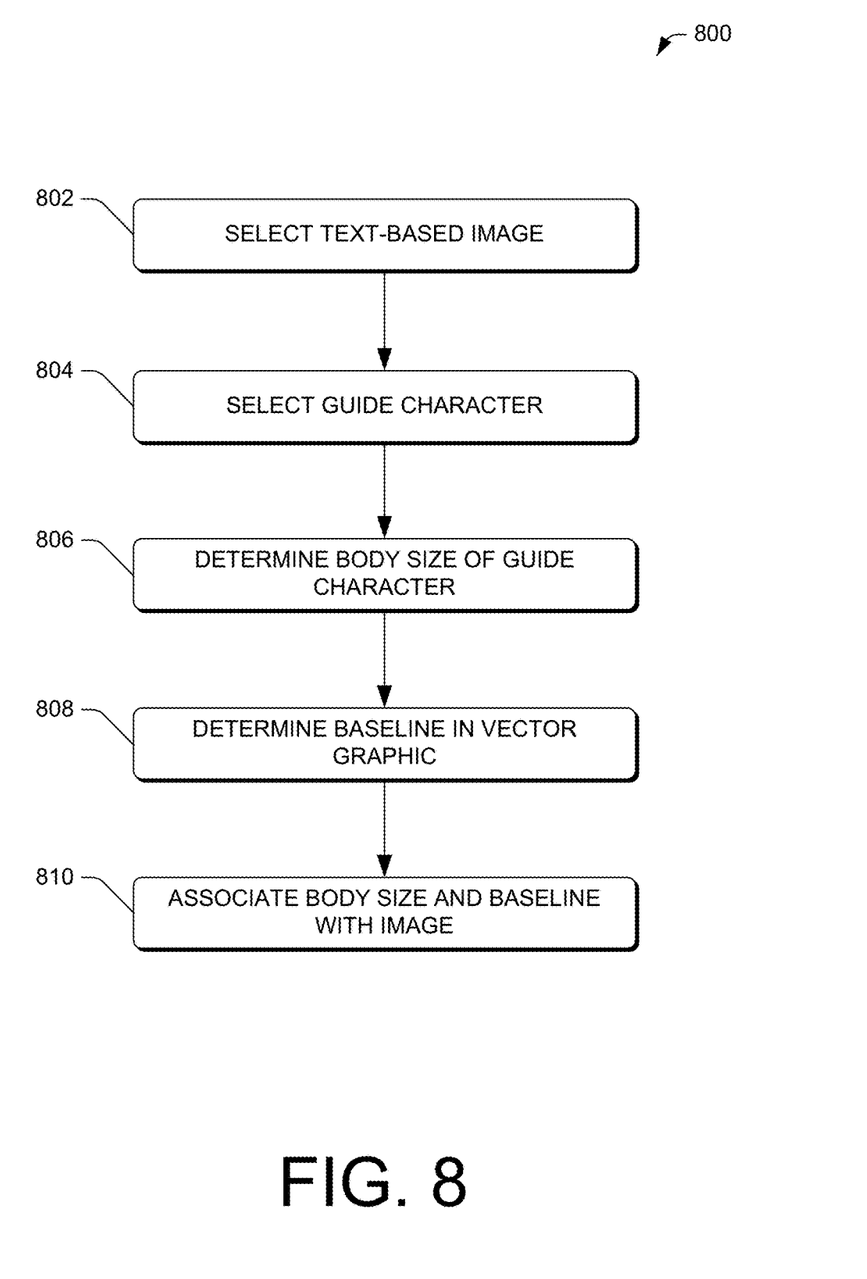
FIG. 8 is a flow diagram of an illustrative process of identifying attributes of a text-based image that is converted to vector graphics.

FIG. 8 is a flow diagram of an illustrative process of identifying attributes of a text-based image that is converted to vector graphics. The attributes, when identified, may be utilized to enhance a display of the image adjacent to normal text. For example, the attributes may enable creation of a seamless transition between text in the VG image and the adjacent normal text. The process 800 may be performed by the image analyzer 128 that is stored on the editor servers 104.

At 802, the image analyzer 128 may select a text-based image, such as the text-based image identified from the operations 704 and 706.

At 804, the image analyzer 128 may select a reference character, such as the reference character 208. The reference character 208 may be determined by OCR, human designation, or by other known techniques.

At 806, the image analyzer 128 may determine the body size 508 of the reference character 208. In some embodiments, the body size 508 may be determined by locating a high point and a low point of the reference character and then calculating a distance between the high point and the low point to calculate the body size 508.

At 808, the image analyzer 128 may determine the baseline 506 of the reference character or of the VG image. In some instances the baseline 506 may align with the low point of the reference character 208 (as shown in FIG. 5). In other instances, the baseline may be relative to (and offset from) the position of the reference character 208. For example, when the textual image is a fraction, the baseline may be the horizontal line of the fraction rather than the numerator or the denominator of the fraction (one of which may be the reference character 208).

At 810, the image analyzer 128 may associate the body size 508 and the baseline 506 with the VG image, such as by storing data in the tag 116. The body size 508 and baseline 506 may then be used to resize and align the VG image with text to create a smooth transition between the text and the VG image without pixilation and/or distortion of the VG image.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, at a viewing device, an element including formatting code, at least one vector graphics image (VG image) including a designated body size, and body text adjacent to the VG image, wherein the VG image is segmented into at least a first segment and a second segment;
comparing a font size of the body text that is designated in the formatting code to the designated body size of the VG image to determine a resizing factor for resizing the VG image;
resizing the VG image based at least in part on the resizing factor; and
reflowing the VG image at a break point that separates the first segment and the second segment, the reflowing including locating the first segment on a first line and the second segment on a second line that is subsequent to the first line in a display space of the viewing device displaying at least a portion of the element including the VG image.

2. The method as recited in claim 1, wherein the VG image further includes a designated baseline, and further comprising positioning the VG image in-line with the body text by aligning the designated baseline of the VG image with a baseline of the body text.

3. The method as recited in claim 1, wherein the formatting code is hypertext markup language (HTML) code.

4. The method as recited in claim 1, wherein the resizing factor resizes the VG image by adjusting the designated body size to a size that substantially matches the font size of the body text.

5. The method as recited in claim 1, wherein the designated body size is a body size of a reference character in the VG image.

6. The method as recited in claim 1, wherein the element further includes a tag that:
identifies the VG image in the element as including text-based content, and
includes the designated body size.

7. The method as recited in claim 1, further comprising receiving an adjustment of a user control of the viewing device requesting to adjust a previous font size of the body text to the font size of the body text.

8. One or more non-transitory computer-readable media storing computer-executable instructions that, when executed, cause one or more processors to perform acts comprising:
loading an electronic document into memory, the electronic document including formatting code, at least one vector graphics image (VG image) including a designated body size, and body text adjacent to the VG image, wherein the VG image is segmented into at least a first segment and a second segment;
resizing the VG image by a resizing factor determined by comparing the designated body size of the VG image to a font size of the body text that is designated in the formatting code, the resizing to create a resized VG image;
reflowing the resized VG image at a break point that separates the first segment and the second segment, the reflowing including locating the first segment on a first line and the second segment on a second line that is subsequent to the first line in a display space of a viewing device; and
causing display on the viewing device of at least a portion of the electronic document including the resized VG image in-line with the body text.

9. The one or more non-transitory computer-readable media as recited in claim 8, wherein the VG image further includes a designated baseline relative to text-based content in the VG image, the acts further comprising positioning the resized VG image in-line with the body text by aligning the designated baseline of the VG image with a baseline of the body text.

10. The one or more non-transitory computer-readable media as recited in claim 8, wherein the designated body size is a body size of a reference character in the VG image.

11. The one or more non-transitory computer-readable media as recited in claim 8, wherein the electronic document further includes a tag that:
identifies the VG image in the electronic document as including text-based content, and
includes the designated body size.

12. A viewing device comprising:
one or more processors; and
memory storing computer-executable instructions that, when executed by the one or more processors, cause a reader application to perform acts comprising:
accessing an electronic document including formatting code, at least one vector graphics image (VG image) including a designated body size, and body text adjacent to the VG image, wherein the VG image is segmented into at least a first segment and a second segment;
selecting a font size of the body text;
comparing the font size of the body text to the designated body size of the VG image to determine a resizing factor for resizing the VG image;
resizing the VG image based at least in part on the resizing factor to create a resized VG image;
reflowing the resized VG image at a break point that separates the first segment and the second segment, the reflowing including locating the first segment on a first line and the second segment on a second line that is subsequent to the first line in a display space of the viewing device;
causing display on the viewing device of at least a portion of the electronic document including the resized VG image.

13. The viewing device as recited in claim 12, wherein the reader application is stored remotely from, and accessible over a network by, the viewing device.

14. The viewing device as recited in claim 12, wherein the selecting the font size of the body text is based at least in part on receiving a request to adjust a previous font size of the body text to the font size of the body text.

15. The viewing device as recited in claim 14, wherein the request to adjust the previous font size of the body text is received via an adjustment of a user control of the viewing device.

16. The viewing device as recited in claim 12, wherein the selecting the font size of the body text is based on at least one of a default font size associated with the viewing device or the display space of the viewing device.

17. The viewing device as recited in claim 12, wherein the designated body size is a body size of a reference character in the VG image.

18. The viewing device as recited in claim 12, wherein the electronic document further includes a tag that:
   identifies the VG image in the electronic document as including text-based content, and
   includes the designated body size.

19. The viewing device as recited in claim 12, wherein the resized VG image includes an adjusted body size of the resized VG image that is substantially a same size as the font size of the body text.

20. The viewing device as recited in claim 12, wherein the VG image further includes a designated baseline, the acts further comprising positioning the resized VG image in-line with the body text by aligning the designated baseline of the VG image with a baseline of the body text.

* * * * *